(12) United States Patent
Rumford et al.

(10) Patent No.: US 8,699,091 B2
(45) Date of Patent: Apr. 15, 2014

(54) SYSTEM FOR PREVIEWING AND IMAGING DOCUMENTS

(75) Inventors: Robert Rumford, Lexington, KY (US); Rebecca Silveston-Keith, Lexington, KY (US); Mark Edwards, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 401 days.

(21) Appl. No.: 12/980,453

(22) Filed: Dec. 29, 2010

(65) Prior Publication Data

US 2012/0170073 A1    Jul. 5, 2012

(51) Int. Cl.
*H04N 1/04* (2006.01)

(52) U.S. Cl.
USPC ........... 358/474; 358/497; 358/486; 358/488; 399/379; 399/380

(58) Field of Classification Search
USPC ............. 358/1.12, 1.16–1.18, 501, 401, 474, 358/497, 444, 488, 486; 399/365, 377, 379, 399/380

See application file for complete search history.

(56) References Cited

U.S. PATENT DOCUMENTS 6,466,302 B1 * 10/2002 Rousseau et al. ............... 355/61
6,697,091 B1 *  2/2004 Rzepkowski et al. ......... 715/835

* cited by examiner

*Primary Examiner* — Marivelisse Santiago Cordero
*Assistant Examiner* — Kent Yip

(57) ABSTRACT

A system for previewing and imaging a document includes an imaging unit having an imaging surface configured to carry the document thereon. The imaging unit also includes an image sensing member configured to capture an image corresponding to the document and an image processing member communicably coupled to the image sensing member to receive the captured image. The image processing member is further configured to convert the captured image to a digital data format. The system further includes a display unit communicably coupled to the image processing member. The display unit includes a user interface configured to exhibit a placement-guiding display object over converted captured image.

14 Claims, 3 Drawing Sheets

SYSTEM FOR PREVIEWING AND IMAGING DOCUMENTS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to imaging systems, such as scanners, copiers, and multi-function imaging systems, and more particularly, to a system for previewing and imaging a document.

2. Description of the Related Art

In various imaging systems, such as a scanner, a copier, and a multi-function imaging system (like an All-in One (AIO) printer), an original document is placed upon an imaging surface/platen made of a material, such as glass, for scanning, copying, printing and other such purposes.

A user of an imaging system may encounter difficulties in appropriately aligning an original document on the scanner's platen in order to obtain an optimally scanned image, such as an image with maximum scan quality and an image scanned in a shortest possible time. For example, in a typical flatbed scanner, a scan bar of the scanner moves under a platen in order to scan the entire length of an original document, starting at a calibration, home position, or edge on one end portion of the platen. Scans are made most optimally when the original document is abutted against the calibration edge and not against the other end portion. In another instance, some flatbed scanners provide a "smart scanning" mode where a user may place a document, such as a 4 inch×6 inch photo, anywhere on a platen. The scan bar may then scan the entire area of the platen. Subsequently, the scanner software discerns the photo apart from the scan background (i.e., extra area of the platen) and outputs an image file with the photo scan data. However, the aforementioned operation is complex and may take more time than a case where the photo may be placed at a preferred, known position on the platen. Accordingly, guiding a user about positioning an original document on a platen of different types of imaging systems may be advantageous. However, guiding, instructing or communicating to a user about aligning an original document along a home position (i.e., reference point) of an imaging system has remained a problem for various manufacturers of scanners, copiers, AIO printers and the like.

Typically, a manufacturer of an imaging system may provide indications, such as moldings, painted arrows and markings, adjacent to a home position on a housing of the imaging system. However, such indications may be overlooked or missed by the user. For example, a user may be unable to perceive marks provided along an edge of a scanner's housing. More specifically, in an AIO printer that includes an auto document feeder, the flatbed scan home position is typically located at a rear corner portion of the printer near a calibration strip for optimum scan response time. Unfortunately, such indicators may only be visible when a scanner lid or cover is opened to a substantial angle. Accordingly, the user may fail to align an original document along the home position as intended, thereby leading to unacceptable results and resulting in the user needing to reproduce copies, scans, prints, etc. again. Furthermore, providing indication about orientation of the original document and reminding the user to align the original document in a correct position or location (e.g., abutted to the home position or centered along an edge of the imaging system) and in a correct orientation (e.g., either portrait or landscape) may be challenging. Additionally, the indications may wear off over a period of time, and the provision of any such indication, particularly painted arrows, may add to costs associated with the imaging system.

In addition, various imaging systems, such as a camera scan system, include a lens that has a spherical surface. Accordingly, the image quality of the area of an original document near the center portion of the platen may be better than the areas of the original document that are positioned nearer to the edges of the platen. FIG. 1 depicts such an image quality drop-off map 10 for a camera scan system prevalent in the prior art. The camera scan system may be employed in a scanner, copier, facsimile machine or other imaging system for performing a scanning, copying or faxing operation and may include a platen or scan glass 100. The scan glass 100 may be utilized to carry a document (not shown) thereon for scanning, copying or faxing purposes.

The camera scan system of FIG. 1 further includes a spherical lens 200, which is used to take an image of the document placed over the scan glass 100. The spherical lens 200 is an optical imaging lens available in the market. Further, the spherical lens 200 has better imaging capability near a center portion (not numbered) of the spherical lens 200 rather than towards edges (not numbered) of the spherical lens 200. As shown in FIG. 1, the image quality drop-off map 10 depicts a decrease in image quality of the document placed over the scan glass 100. More specifically, the quality of the image decreases near edges (not numbered) of the scan glass 100 as compared to the quality of the image near a center portion (not numbered) of the scan glass 100, as shown by a straight arrow 300 pointing from the center portion of the scan glass 100 towards an edge (not numbered) of the scan glass 100. Accordingly, the image of the document near respective edges of the document may not be clearly visible, thereby leading to unacceptable quality and or unwanted repetition of the scanning, copying or faxing operation.

The image quality drop-off map 10 has been shown to be topographically circular for the ease of depiction only. It may be evident that the image quality drop-off map 10 may be of any other topographic shape.

Various approaches for correcting distortion of images obtained through the imaging systems that use a camera lens, have been devised. However, imaging systems employing such approaches to correct the distortion of images are typically processor intensive, impacting electronic architecture and overall cost. Further, various approaches for obtaining a preview of original documents prior to imaging operations have been devised for minimizing the problems associated with alignment of the original documents over respective platens of the imaging systems. Thus, such approaches have been unable to facilitate an appropriate alignment of the original documents over the platens of the imaging systems to obtain optimally scanned images using less financial and/or labor resources.

Accordingly, there persists a need for an efficient and cost-effective system for previewing and imaging a document that facilitates an appropriate alignment of the document over a platen of the system, at a correct location and in a correct orientation for an imaging operation.

SUMMARY OF THE DISCLOSURE

The general purpose of the present disclosure is to provide a system for previewing and imaging a document, by including all the advantages of the prior art and overcoming the drawbacks inherent therein.

The present disclosure provides a system for previewing and imaging a document. The system includes an imaging unit including an imaging surface configured to receive the document thereon. The imaging unit also includes an image sensing member configured to capture an image corresponding to the document during an imaging operation. The imaging unit further includes an image processing member communicably coupled to the image sensing member to receive the captured image. The image processing member is further configured to convert the captured image to a digital data format.

Additionally, the system may include a display unit communicably coupled to the image processing member. The display unit includes a user interface configured to exhibit a placement-guiding display object over the converted captured image.

BRIEF DESCRIPTION OF THE DRAWINGS

The above-mentioned and other features and advantages of the present disclosure, and the manner of attaining them, will become more apparent and will be better understood by reference to the following description of embodiments of the disclosure taken in conjunction with the accompanying drawings, wherein.

DETAILED DESCRIPTION

Figure 1:
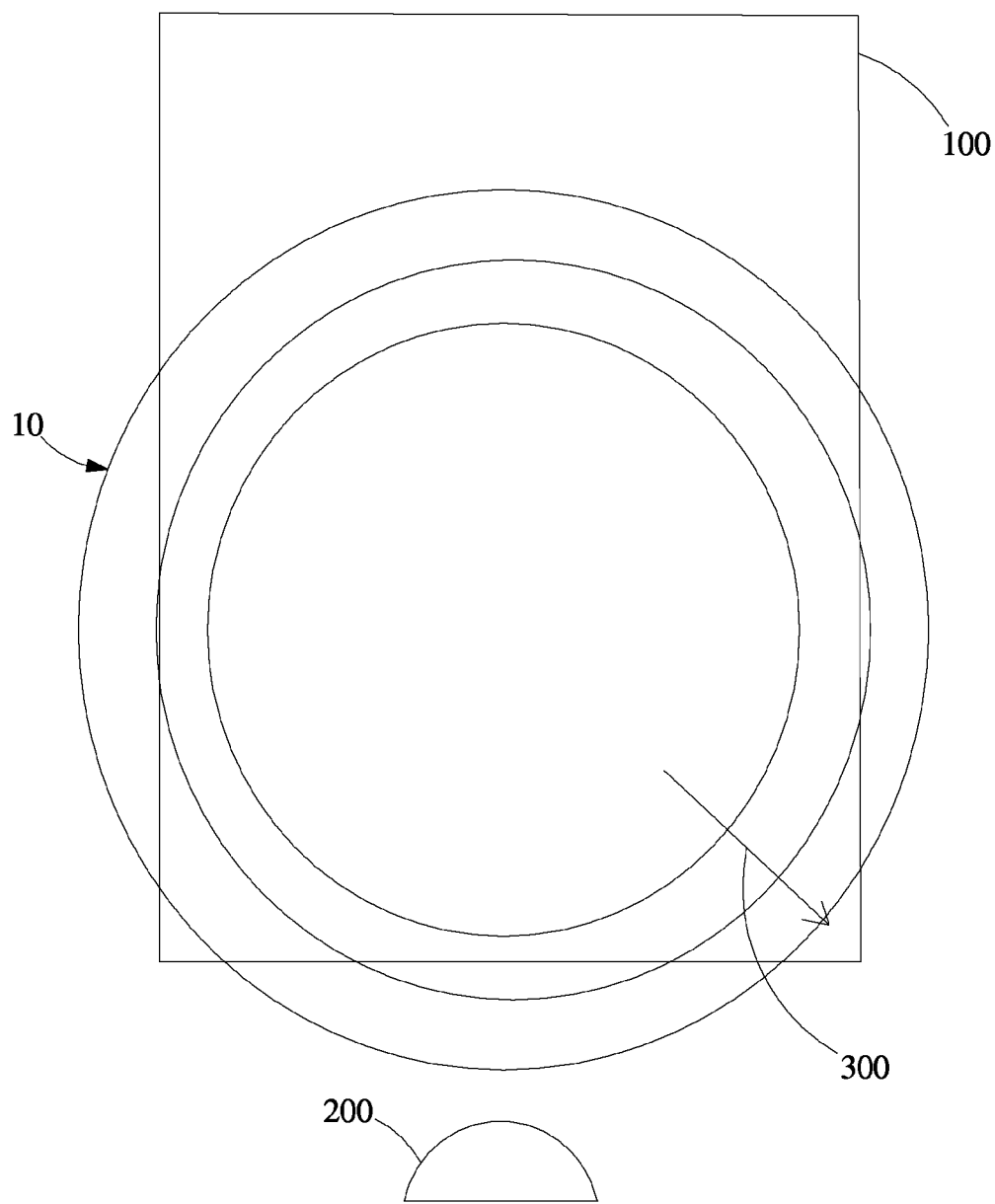
FIG. 1 illustrates an image quality drop-off map for a prior art camera scan system.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the disclosure may be implemented in software. As such, it should be noted that a plurality of hardware and software-based devices, as well as a plurality of different structural components may be utilized to implement the disclosure. Furthermore, and as described in subsequent paragraphs, the specific mechanical configurations illustrated in the drawings are intended to exemplify embodiments and that other alternative mechanical configurations are possible.

The present disclosure provides a system for previewing and imaging a document that includes an imaging unit. The imaging unit includes an imaging surface configured to carry the document thereon. The imaging unit further includes an image sensing member configured to capture an image corresponding to the document during an imaging operation. The imaging unit also includes an image processing member communicably coupled to the image sensing member to receive the captured image from the image sensing member. The image processing member is further configured to convert the captured image to a digital data format.

The system further includes a display unit communicably coupled to the image processing member. The display unit includes a preview interface configured to provide a preview of the imaging surface and a preview of an image corresponding to the digital data format of the document carried by the imaging surface. The display unit further includes a user interface disposed on the preview interface and configured to exhibit at least one display object over the preview of the imaging surface. A display object of the at least one display object is a placement-guiding display object configured to be superimposed over the preview of the imaging surface in order to facilitate alignment of the image corresponding to the digital data format of the document within the placement-guiding display object. The system for previewing and imaging the document is described in conjunction with FIGS. 2 and 3.

Figure 2:
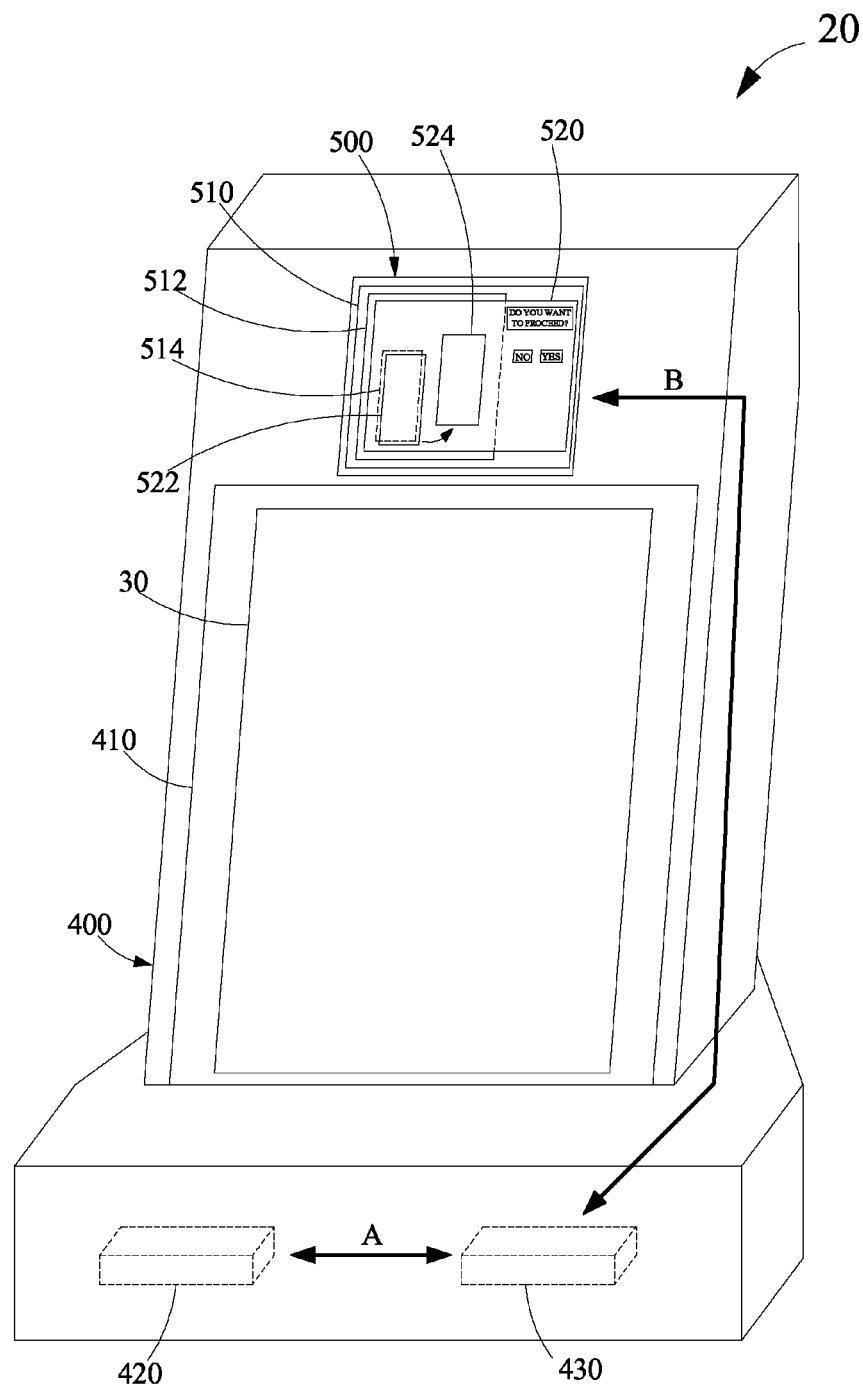
FIG. 2 illustrates a perspective view of a system for previewing and imaging a document in accordance with an embodiment of the present disclosure.

FIG. 2 depicts a perspective view of a system 20 for previewing and imaging a document, such as an original document 30. Document 30 may be of any shape, size, and type, such as A3, A4, A5, A6, Legal, a bound document and the like. The system 20 may include an imaging unit or component 400. Examples of system 20 include, but are not limited to, a scanner, a copier, a facsimile machine, a multi-function imaging system a multi-function printing device and any such other imaging device. For the purposes of this description, the imaging unit 400 is a scanner component, as shown in FIG. 2. In addition, the system 20 may include a personal computer (not shown) coupled to the imaging unit 400 for user interaction purposes.

Further, the system 20 may be rectangular in shape, and may be made of a durable and a hard material, such as a plastic material, a metallic material and the like, as known in the art. It is to be understood that the shape, structure and material of the imaging unit 400 should not be considered as a limitation to the scope of the present disclosure.

The imaging unit 400 may include an imaging surface 410 as shown in FIG. 2. Imaging surface 410 may be configured to carry document 30 thereon. Further, the imaging surface 410 may be configured in such a manner that document 30 completely rests on the imaging surface 410 in a vertically or substantially vertically inclined orientation. Alternately, the imaging surface 410 may be configured in a horizontal configuration such that the document 30 rests on the imaging surface 410 in a horizontal orientation.

The imaging surface 410 may be made of a transparent material, such as a glass material, when imaging is to be performed from under an original document, such as the document 30. Alternately, the imaging surface 410 may be made of an opaque material, such as a plastic material, when the imaging is to be performed from above an original document, such as in the case of book imaging systems. Further, the imaging surface 410 may have structural rigidity so as to withstand a weight of the document 30 lying thereon. Furthermore, the imaging surface 410 may have a sufficient width and length such that the document 30 lying thereon is imaged or scanned without hindrance. Further, the imaging unit 400 may include a covering member (not shown) to cover the document 30 carried by the imaging surface 410 during an imaging operation, such as a scanning operation.

The imaging unit 400 may also include an image sensing member 420 configured to capture an image corresponding to the document 30 during the imaging operation. More specifically, the image sensing member 420 may capture the image of the document 30 lying on the imaging surface 410 by an imaging mechanism, such as by flashing a beam of light incident on the imaging surface 410 visible to the image sensing member 420, as known in the art. The captured image of the document 30 may be temporarily saved in a memory unit (not shown) of the image sensing member 420.

As depicted in FIG. 2, the image sensing member 420 may be positioned within the imaging unit 400 in such a manner that the image sensing member 420 captures the image of the document 30 in its entirety and in an optimal manner, such that the document 30 is completely and clearly visible during the imaging operation. Alternately, the image sensing member 420 may be positioned outside the imaging unit 400, i.e., the image sensing member 420 may be configured on an outer portion (not shown) of the imaging unit 400. Accordingly, the position of the image sensing member 420, as shown in FIG. 2, should not be considered as a limitation to the present disclosure. The image sensing member 420 may be a Charge Coupled Device (CCD), Contact Image Sensor (CIS), and the like, as may be used in a scanner. Further, the image sensing member 420 may be in the form of a digital camera installed within/on the imaging unit 400 to capture the image of the document 30.

As shown in FIG. 2, the imaging unit 400 of the system 20 may also include an image processing member 430 communicably coupled to the image sensing member 420 to receive the captured image of the document 30 from the image sensing member 420. The image processing member 430 may be in the form of a digital signal processor and may be coupled to the image sensing member 420 with the help of electrical cables and the like. The communication between the image processing member 430 and the image sensing member 420 may be in the form of digital signals, as shown by directional arrow 'A' in FIG. 2.

The image processing member 430 may be further configured to convert the captured image of the document 30 received from the image sensing member 420 to an electronic or digital data format, such as an image format (e.g., a JPG file, .tiff file, .bmp file, etc.), a video format (e.g., a flash video format or any other video format known in the art) and the like. In addition, the image processing member 430 may be configured to have electronic circuitry (not shown) required to carry out the desired conversion and/or processing of the captured image of the document 30. Accordingly, the image processing member 430 may be provided with the firmware and software required to process the captured image of the document 30, as is known in the art.

The image processing member 430 may be configured to detect an alignment of the document 30 as carried by the imaging surface 410. The image processing member 430 may compare the detected alignment with a predetermined alignment required for the document 30. The predetermined alignment is an optimal alignment as determined by the firmware and software of the system 20. Specifically, the predetermined alignment may be an optimal alignment for the system 20 as determined by the image processing member 430 for an optimal placement and orientation of the document 30 over the imaging surface 410 in order to yield an improved quality of a scan (i.e., an optimal or perfect scan) or to perform a faster scan of the document 30.

The system 20 may further include a display unit 500 communicably coupled to the image processing member 430. The display unit 500 may receive the digital data format of the document 30 from the image processing member 430. The coupling between the image processing member 430 and the display unit 500 may be in the form of digital signals as shown by directional arrow 13' in FIG. 2. As shown in FIG. 2, the display unit 500 may be in the form of an operator panel displayed on the imaging unit 400. Alternately, the display unit 500 may appear on a screen or monitor of the personal computer that may be coupled to the imaging unit 400 of the system 20.

The display unit 500 may include a preview interface 510 configured to provide a either a static (i.e., 'snapshot') or, preferentially, a dynamic ('real-time video') live preview 512 of the imaging surface 410. Further, the preview interface 510 may also display a preview of an image 514, corresponding to the digital data of the document 30 carried by the imaging surface 410. In some embodiments, the preview 512 of the imaging surface 410 may occur in such quick succession, thereby leaving the user with the impression that he is viewing a live preview rather than "instantaneous" snapshots.

The preview interface 510 may facilitate a user seeing the preview 512 of the imaging surface 410 and the preview of the image 514 corresponding to the digital data of the document 30 carried by the imaging surface 410 thereon. Accordingly, the user may observe whether the document 30 is placed at a correct position and in a correct orientation on the imaging surface 410.

Figure 3:
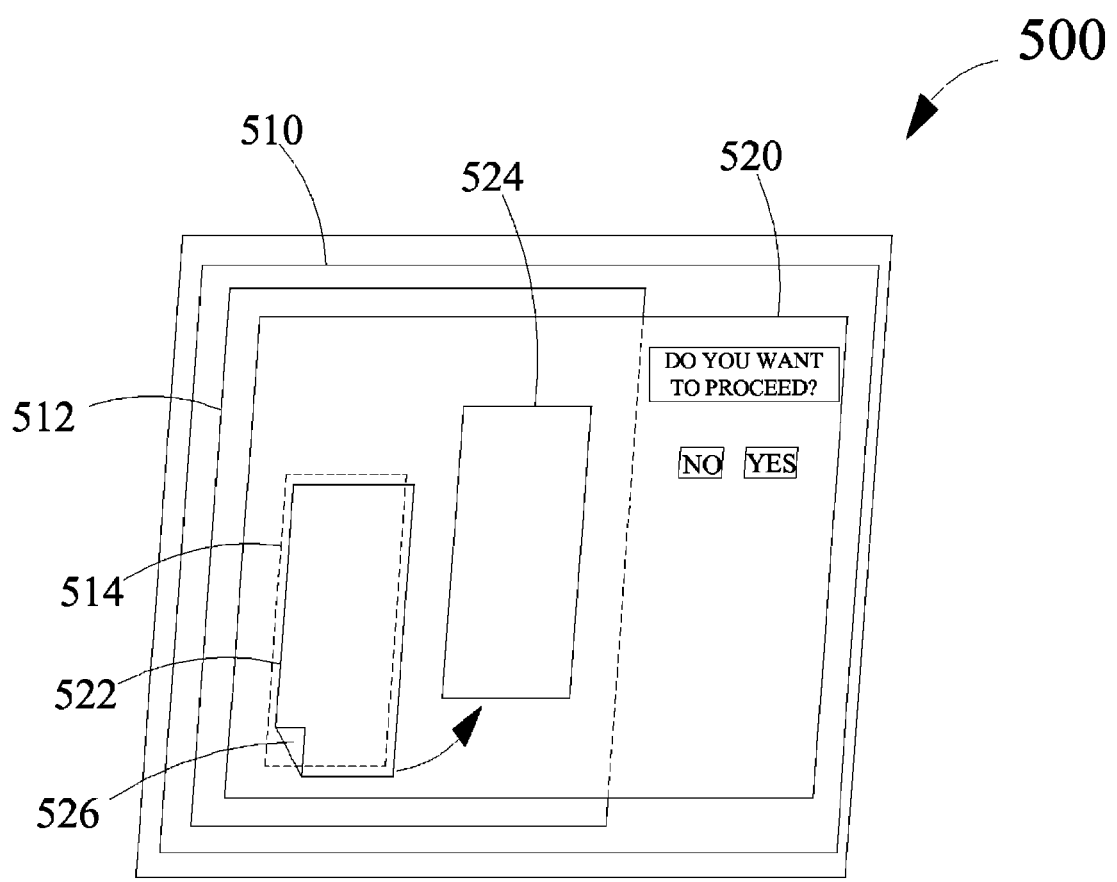
FIG. 3 illustrates a display unit of the system as illustrated in FIG. 2.

The display unit 500 of the system 20 may further include a user interface 520 disposed on the preview interface 510. The user interface 520 may be configured to exhibit at least one display object over the live preview 512 of the imaging surface 410. A display object of the at least one display object is a placement-guiding display object 522. The placement-guiding display object 522 may be configured to be disposed over the live preview 512 of the imaging surface 410. Additionally, the placement-guiding display object 522 may be displayed in various forms generally indicating an outline of an area, such as in the form of a box, as shown in FIGS. 2 and 3. Alternately, the placement-guiding display object 522 may be represented in the form of a plurality of arrows; geometric shapes such as a circle, rhombus; icons; and other means of representing the shape of the document 30. The color, shape, and other such characteristics (such as line thickness and the like) of the placement-guiding display object 522 should not be considered as a limitation for the present disclosure.

Further, the placement-guiding display object 522 may be configured to be superimposed over the preview 512 of the imaging surface 410 in order to facilitate alignment of the image 514 of the document 30 within the placement-guiding display object 522, as shown in FIG. 2. Specifically, the image processing member 430 may facilitate a display of the placement-guiding display object 522 over the preview 512 with reference to the document 30. The image processing member 430 may also facilitate the movement of placement-guiding display object 522 to a predetermined position 524 within the user interface 520, as shown in FIG. 2. The predetermined position 524 of the placement-guiding display object 522 may be an optimal position as determined by the image processing member 430 and may correspond to the predetermined alignment required for the document 30 over the imaging surface 410 in order to yield an improved quality of the scan (i.e., an optimal or perfect scan) of the document 30.

The placement-guiding display object 522 may be configured to have a size corresponding to a size of the document 30 carried by the imaging surface 410. For example, when a size, such as Letter, for the document 30, is the default size, then the placement-guiding display object 522 in the form of a Letter-sized guide-box may be displayed at the predetermined position 524. Further, the image processing member 430 may observe the size of the image 514 corresponding to the digital data of the document 30 in order to adjust the size of the placement-guiding display object 522, such that the size of the placement-guiding display object 522 corresponds to the size of the image 514 corresponding to the digital data of the document 30.

Further, the image processing member 430 may guide or facilitate movement of the placement-guiding display object 522 or be used to guide or assist a user in rotating the digital data of the document 30 carried by the imaging surface 410. For example, the document 30 may be placed in a landscape orientation on the imaging surface 410, whereas imaging or scanning may be required in a portrait orientation.

The display object may also include other optional features for guiding the user. For example, the display object may include a text display, such as "YES," "NO," and "DO YOU WANT TO PROCEED?," as shown in FIG. 2. Additionally, one or more display objects may be in the form of animated display objects.

Similarly, the placement-guiding display object 522 may also be displayed in an animated manner. For example, the placement-guiding display object 522 in the form of a guide-box may be displayed on the display unit 500 as a series of frames moving over the image 514 in order to be displayed at the predetermined position 524 corresponding to the predetermined alignment required for the document 30.

As shown in FIG. 3, the placement-guiding display object 522 may also include a 'face-up' or 'face-down' indication portion, for example, a flap 526 optionally with lines suggesting text (as is well-known in the art), configured at an end portion (not numbered) of the placement-guiding display object 522. The flap 526 of the placement-guiding display object 522 may assist the user in aligning the document 30 carried by the imaging surface 410 in a predetermined orientation, which may either be a face-down orientation or a face-up orientation, depending on the scan-system type.

The system 20 may then proceed with the imaging operation (e.g., scanning) once the document 30 is placed optimally at the correct location and in the correct orientation over the imaging surface 410.

As an example of use, a user may place the document 30 on the imaging surface 410 of the system 20. The user may then enter 'Scan Mode' with a button press (not shown) provided on the display unit 500. Thereafter, the preview 512 of the imaging surface 410 may be displayed on the preview interface 510 of the display unit 500. The display unit 500 may also display the image 514 corresponding to the digital data of the document 30 carried by the imaging surface 410, on the preview interface 510. Simultaneously, the placement-guiding display object 522 may be displayed on the user interface 520 of the display unit 500 in such a manner that the position of the placement-guiding display object 522 is optimally suited to the corresponding document 30 carried by the imaging surface 410. For example, when the document 30 is placed in an incorrect alignment (i.e., at an incorrect location and/or in an incorrect orientation) on the imaging surface 410, the placement-guiding display object 522 may be displayed in a series of moving frames, such that the placement-guiding display object 522 moves to the predetermined position 524 thereof in order to illustrate the movement of document the 30 necessary to produce an optimal scan or copy of the document 30. This illustration on display unit 500 may provide assistance to the user by showing the user the direction in which to move the document 30 to a correct location on the imaging surface 410. Once the user moves the document 30 as referenced on the display unit 500, the user may then launch the scanning operation by pressing a 'Scan' button (not shown) that may be provided on the display unit 500. Thereafter, a single image of the document 30 may be "snapped" or converted to digital image data. The image of document 30 may also be cropped to the respective size of the placement-guiding display object 522. As will be understood by those skilled in the art, in other embodiments other imaging operations, such as faxing or copying, may be performed by a user.

Further, the placement-guiding display object 522 may be displayed with the flap 526 in order to indicate or guide the user to align the document 30 in the face-down orientation on the imaging surface 410 when the user has placed the document 30 with a blank side of the document 30 towards the image sensing member 420.

Further, when the user fails to observe the appearance and/or movement of the placement-guiding display object 522 within the user interface 520 while placing the document 30 on the imaging surface 410, the image processing member 430 may proceed considering that the user has complied with placement directions as indicated with the assistance of the placement-guiding display object 522. Alternately, the image processing member 430 may provide further indications by displaying a display object, such as a text display, "Here is what your scan will look like. Proceed?," on the user interface 520. Furthermore, the image processing member 430 may otherwise observe a best optimal view of the document 30 as carried by the imaging surface 410 through the image sensing member 420 and facilitate the system 20 to generate a closest possible optimal scan or copy of the document 30.

The present disclosure provides an efficient and cost-effective system for previewing and imaging documents. The system of the present disclosure is capable of guiding a user and displaying an easy-to-understand and optimal preview of a document placed on an imaging surface of the system to illustrate and facilitate an appropriate alignment of the document over the imaging surface at a correct location and in a correct orientation. Based on the foregoing, the user may also be capable of adjusting the placement of the document to a position that is an optimal zone for a lens imaging field of a scan system in order to provide a sufficiently high imaging quality. The system further eliminates the need for providing any indications in the form of marks or arrows on housings of various imaging systems, thereby addressing to problems associated with cost, wear and tear, and the like.

The foregoing description of several embodiments of the present disclosure has been presented for purposes of illustration. It is not intended to be exhaustive or to limit the disclosure to the precise forms disclosed, and obviously many modifications and variations are possible in light of the above teaching. It is intended that the scope of the disclosure be defined by the claims appended hereto.

What is claimed is:

1. A system for previewing and imaging a document, the system comprising:
   an imaging unit comprising:
     an imaging surface configured to receive the document thereon;
     an image sensing member configured to capture an image corresponding to the document during an imaging operation; and
     an image processing member communicably coupled to the image sensing member to receive the captured image, the image processing member further configured to:
       convert the captured image to a digital data format,
       detect a position of the document, and
       compare the detected position with an optimal position for the document; and
   a display unit communicably coupled to the image processing member, the display unit comprising a user interface for displaying a placement-guiding display object over the converted captured image relative to the imaging surface, and if the imaging processing member determines that the detected position fails to match the optimal position, for displaying on the user interface a series of frames that depicts a movement of the placement-guiding display object from the detected position to the optimal position.

2. The system of claim 1, wherein the movement of the placement-guiding display object is animated.

3. The system of claim 1, wherein the placement-guiding display object is displayed with a flap configured at an end portion of the placement-guiding display object if the imaging processing member determines that the captured image corresponds to a blank side of the document.

4. The system of claim 1, wherein the image processing member comprises a digital signal processor.

5. The system of claim 1, wherein the digital data format is one of an image format and a video format.

6. The system of claim 1, wherein the image processing member causes the placement-guiding display object to be rotated.

7. The system of claim 1, wherein the placement-guiding display object has a size corresponding to a size of the document.

8. The system of claim 1, wherein the image processing member is configured to generate a display of the placement-guiding display object having a size corresponding to the size of the converted captured image.

9. The method of claim 1, wherein the displayed movement of the placement-guiding display object corresponds to a direction in which the document must be moved relative to the imaging surface to align the document with the optimal position.

10. The method of claim 1, wherein the movement of the placement-guiding display object is based upon a predetermined position required by the image processing member on the imaging surface in order to yield an optimal scan of the document.

11. An apparatus for imaging a document, comprising:
    a vertically aligned imaging surface to receive the document thereon;
    an image sensor component to sense the placement of the document;
    an image capture component to capture an electronic image of the document;
    an image processing member to determine if the placement of the document corresponds to an optimal position for the document; and
    a display communicably coupled to the image capture component, the display displaying a placement-guiding object over the captured electronic image, and if the image processing member determines that the placement of the document fails to match the optimal position, the display further displaying a series of moving frames such that the placement-guiding object is displayed as moving from the placement to the optimal position.

12. The apparatus of claim 11, wherein the placement-guiding object is superimposed over the captured image.

13. A method for imaging a document, comprising:
    receiving a document on a vertically aligned imaging surface;
    sensing the placement of the document;
    capturing an electronic image of the document;
    displaying a placement-guiding object over the captured image;
    determining if the placement of the document corresponds to an optimal position for the document; and
    if the placement of the document fails to correspond to the optimal position, displaying a series of frames corresponding to the placement-guiding object such that the placement guiding object is displayed as moving from the placement to the optimal position.

14. The method of claim 13, wherein the placement-guiding object is superimposed over the captured image.

* * * * *